(12) United States Patent
Myllylä

(10) Patent No.: US 8,769,437 B2
(45) Date of Patent: Jul. 1, 2014

(54) METHOD, APPARATUS AND COMPUTER PROGRAM PRODUCT FOR DISPLAYING VIRTUAL MEDIA ITEMS IN A VISUAL MEDIA

(75) Inventor: Tomi Myllylä, Espoo (FI)

(73) Assignee: Nokia Corporation, Espoo (FI)

( * ) Notice: Subject to any disclaimer, the term of this patent is extended or adjusted under 35 U.S.C. 154(b) by 1896 days.

(21) Appl. No.: 11/954,259

(22) Filed: Dec. 12, 2007

(65) Prior Publication Data
US 2009/0158206 A1 Jun. 18, 2009

(51) Int. Cl.
*G06F 3/14* (2006.01)
(52) U.S. Cl.
USPC ... 715/850; 348/14.08; 348/169; 348/333.01; 348/348; 250/201.2; 396/89; 701/45
(58) Field of Classification Search
USPC .......... 715/200–277, 700–867; 700/701–866; 709/201–229; 705/50–79; 345/30–111; 250/201.2; 348/14.08, 169, 333.01, 348/348; 396/89; 701/45
See application file for complete search history.

(56) References Cited

U.S. PATENT DOCUMENTS

| | | | |
|---|---|---|---|
| 7,183,530 B2 * | 2/2007 | Abe | 250/201.2 |
| 7,630,806 B2 * | 12/2009 | Breed | 701/45 |
| 7,683,962 B2 * | 3/2010 | Border et al. | 348/348 |
| 2003/0080978 A1 | 5/2003 | Navab et al. | |
| 2003/0218638 A1 | 11/2003 | Goose et al. | |
| 2007/0117576 A1 | 5/2007 | Huston | |
| 2007/0164988 A1 | 7/2007 | Ryu et al. | |
| 2007/0242086 A1 | 10/2007 | Tsujimoto et al. | |
| 2008/0106629 A1 * | 5/2008 | Kurtz et al. | 348/333.01 |
| 2008/0129825 A1 * | 6/2008 | DeAngelis et al. | 348/169 |
| 2008/0165267 A1 * | 7/2008 | Cok | 348/333.01 |
| 2008/0219654 A1 * | 9/2008 | Border et al. | 396/89 |
| 2008/0297586 A1 * | 12/2008 | Kurtz et al. | 348/14.08 |

FOREIGN PATENT DOCUMENTS

| | | |
|---|---|---|
| EP | 1 435 737 A1 | 7/2004 |
| EP | 1 521 216 A1 | 4/2005 |
| EP | 1 814 101 A1 | 8/2007 |
| WO | WO 2005/057913 A1 | 6/2005 |
| WO | WO 2006/070047 | 7/2006 |

OTHER PUBLICATIONS

European Search Report for corresponding EP Application No. 08170566.7-1247, Nov. 18, 2009, pp. 1-10.

* cited by examiner

*Primary Examiner* — Ruay Ho
(74) *Attorney, Agent, or Firm* — Ditthavong & Steiner, P.C.

(57) ABSTRACT

A method, apparatus and computer program product are provided for displaying first media content item with a second media content item inserted within the display of the first media content item. In particular, the second media content item can be displayed with the first media content item when location information associated with the second media content item describes a location with a capture zone of the first media content item.

25 Claims, 6 Drawing Sheets

METHOD, APPARATUS AND COMPUTER PROGRAM PRODUCT FOR DISPLAYING VIRTUAL MEDIA ITEMS IN A VISUAL MEDIA

TECHNOLOGICAL FIELD

Embodiments of the present invention relate generally to augmented reality, and more particularly, relate to a method, apparatus and computer program for displaying virtual media content items in a visual media.

BACKGROUND

The information age has brought about various ways in which users of communications devices share and interact with information. As part of the information age, the Internet brought about services such as email and bulletin boards which can provide ways in which users can share and interact with information. As information sharing resources, such as bandwidth and storage capacity, continue to grow, novel ways of sharing and interacting with information continue to arise.

Currently, social networking websites and media content sharing websites provide a means of sharing information that has become increasingly popular. On these websites, users can share various media content items, such as, photos and videos in addition to profile information and other contextual information. The media items that are shared, often photos and videos, may relate to scenes and events that may be of interest to other users of the website. Users of the websites can browse through the media content provided on the website. The media content items can be essentially static renditions of past real world scenes and events. Other than being able to view the media content, often these websites provide no other means of interacting with the media content. However, it may be useful or interesting to allow further interaction with these media content items and, in some instances introduce current real world content to the media items.

Combining computer generated data with real-world media content is often referred to as Augmented Reality (AR). In order to implement AR applications, often the location associated with either or both of the real-world media content item and the computer generated media content item may be required. As such, if the location of a media content item were known, then various AR-type applications could be implemented with media content on the aforementioned websites.

With the emergence of global positioning system (GPS) technologies, and other positioning technologies implemented on mobile devices, such as cellular phones and handheld GPS positioning devices, location information has become more readily available. As such, mobile devices may provide a vehicle for implementing useful and interesting AR applications, due to the ability to locate an object or a user. Since it has become quite common for individuals to have mobile devices in their possession, these devices have become a rather accurate means of indicating the location of an individual. As a result, various applications are currently utilized which track and log the movements of mobile terminal users. Further, since many mobile devices include camera capabilities, mobile devices may provide a platform to acquiring location information with respect to media content items as well.

Thus, it may be desirable to implement AR-type applications in various settings, such as in media content provided on social networking and media content sharing websites. In particular, it may be desirable to incorporate additional real world and virtual events and information into media content.

BRIEF SUMMARY

A method, apparatus and computer program product are therefore provided to introduce real world and virtual information into media content based on location information. Embodiments of the invention can comprise receiving a first media content item wherein the first media content item can include location information and orientation information. The location and orientation information of the first media content item can be used to determine a capture zone with respect to the first media content item. Further, a second media content item can be received where the second media content item includes location information. The second media content item can be displayed within the first media content item when the location information of the second media content item indicates that the second media content item is located within the capture zone. In some embodiments, the second media content item can be displayed at a location within the first media content item that is associated with the location where the second media content item is found within the capture zone. Additionally, in some embodiments, the second media content item can be displayed when the location information of the second media content item changes, and in this manner, movement of the second media content item can be realized.

In other embodiments of the invention, the second media content item can be displayed at differing sizes depending on the distance between the location where the first media content item was captured, and the location of the second media content item. Additionally, in some embodiments, the second media content item can further include orientation information, and the second media content item can be displayed according to the second media content item's orientation with respect to the location information and orientation information of the first media content item. Further, in another embodiment of the invention, the location of the second media content item can be associated with the location of a mobile device. In a similar manner, in yet another embodiment of the invention, the location and orientation of the second media content item can be associated with the location and orientation of a mobile device.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

Figure 1:
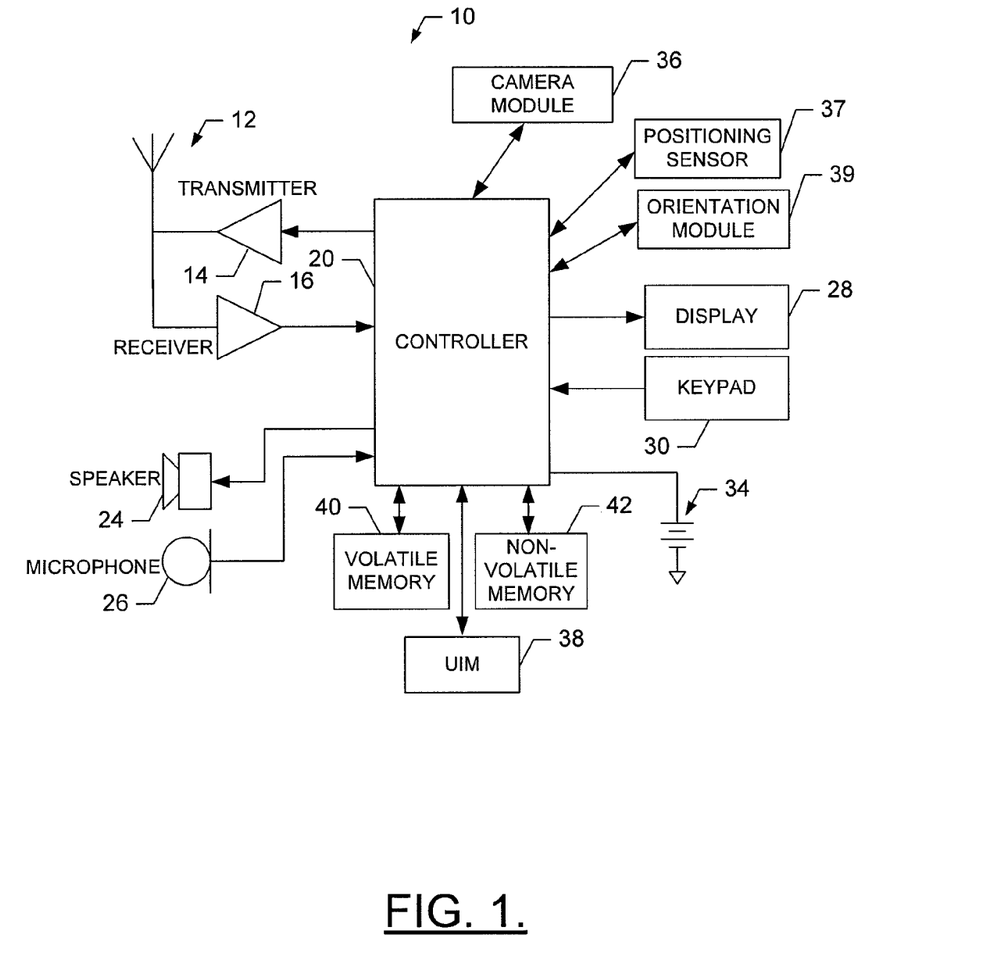
FIG. 1 is a schematic block diagram of a mobile terminal according to an exemplary embodiment of the present invention.

FIG. 1 illustrates a block diagram of a mobile terminal 10 that may benefit from embodiments of the present invention. It should be understood, however, that a mobile telephone as illustrated and hereinafter described is merely illustrative of one type of mobile terminal that may benefit from embodiments of the present invention and, therefore, should not be taken to limit the scope of embodiments of the present invention. While one embodiment of the mobile terminal 10 is illustrated and will be hereinafter described for purposes of example, other types of mobile terminals, such as portable digital assistants (PDAs), pagers, mobile computers, mobile televisions, gaming devices, laptop computers, cameras, video recorders, GPS devices and other types of voice and text communications systems, can readily employ embodiments of the present invention. Furthermore, devices that are not mobile may also readily employ embodiments of the present invention.

Embodiments of the present invention will be primarily described below in conjunction with mobile communications applications. However, it should be understood that the system and method of embodiments of the present invention can be utilized in conjunction with a variety of other applications, both in the mobile communications industries and outside of the mobile communications industries.

The mobile terminal 10 includes an antenna 12 (or multiple antennae) in operable communication with a transmitter 14 and a receiver 16. The mobile terminal 10 further includes a processor, such as a controller 20 or other processing element or computing device, that provides signals to and receives signals from the transmitter 14 and receiver 16, respectively. The signals include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with fourth-generation (4G) wireless communication protocols or the like.

It is understood that the apparatus such as the controller 20 includes means, such as circuitry, desirable for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other hard and/or soft keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a positioning sensor 37 such as, for example, a global positioning system (GPS) module in communication with the controller 20. The positioning sensor 37 may be any means, device or circuitry for locating the position of mobile terminal 10. The positioning sensor 37 may include all hardware for locating the position of a mobile terminal 10. Alternatively or additionally, the positioning sensor 37 may utilize a memory device of the mobile terminal 10 to store instructions for execution by the controller 20 in the form of software necessary to determine the position of the mobile terminal 10. Although the positioning sensor 37 of this example may be a GPS module, the positioning sensor 37 may include or otherwise alternatively be embodied as, for example, an assisted global positioning system (Assisted-GPS) sensor, or a positioning client, which may be in communication with a network device to receive and/or transmit information, such as a sky or floor sensor, for use in determining a position of the mobile terminal 10. In this regard, the position of the mobile terminal 10 may be determined by GPS, as described above, cell ID, signal triangulation, or other mechanisms as well. In one exemplary embodiment, the positioning sensor 37 includes a pedometer or inertial sensor. As such, the positioning sensor 37 may be capable of determining a location of the mobile terminal 10, such as, for example, longitudinal and latitudinal directions, and altitude direction of the mobile terminal 10, or a position relative to a reference point such as a destination or start point. Information from the positioning sensor 37 may then be communicated to a memory of the mobile terminal 10 or to another memory device to be stored as a position history or location information. Additionally, the positioning sensor 37 may be capable of utilizing the controller 20 to transmit/receive, via the transmitter 14/receiver 16, location information such as the position of the mobile terminal 10.

Additionally, in some embodiments, mobile terminal 10 can include an orientation module 39. Orientation module 39 can determine the orientation of mobile terminal 10, i.e. the direction in which mobile terminal 10 is pointed. The orientation module can include means for determining the pan, pitch and yaw, which can collectively be referred to as orientation information, of mobile terminal 10. A means for determining pan, pitch and yaw can be a compass, a horizon sensor, gravity sensor or any other sensor. The orientation of mobile terminal 10 can be represented by the orientation information. Orientation information can include values for pan, pitch, and yaw. Pan can be the direction about a vertical axis, such as a compass heading. Pitch can be the direction about a horizontal axis, such as a direction with respect to the horizon. Yaw can be the positioning of mobile terminal 10 about an axis generated by the combination of the heading and the pitch. In this regard, the yaw of mobile terminal 10 can change when mobile terminal 10 is turned on its side. Orientation module 39 may be any means, device or circuitry for determining the orientation of mobile terminal 10. Orientation module 39 may include all hardware for determining the orientation mobile terminal 10. Alternatively or additionally, the orientation module 39 may utilize a memory device of the mobile terminal 10 to store instructions for execution by the controller 20 in the form of software necessary to determine the orientation of the mobile terminal 10. Information from the orientation module 39 may then be communicated to a memory of the mobile terminal 10 or to another memory device to be stored as orientation information. Additionally, orientation module 39 may be capable of utilizing the controller 20 to transmit/receive, via the transmitter 14/receiver 16, orientation information such as the orientation of the mobile terminal 10.

In some embodiments, the orientation of the mobile terminal 10 may not be indicative of the orientation of a user of mobile terminal 10. For example, if a user of mobile terminal 10 is walking and keeping the mobile device in his/her pocket, the orientation of mobile 10 may not be indicative of the orientation of the user. As such, in some embodiments, the movement of mobile terminal 10 using positioning sensor 37 in conjunction with the orientation module 39 may be used to determine orientation information. For example, if the user is moving in a direction as indicated by changes in location information captured from positioning sensor 37, orientation module 39 can generate orientation information that indicates that the front of the user is oriented in the direction of the movement.

In some embodiments, the mobile terminal 10 includes a media capturing element, such as a camera, video and/or audio module, in communication with the controller 20. The media capturing element may be any means for capturing an image, video and/or audio for storage, display or transmission. For example, in an exemplary embodiment in which the media capturing element is a camera module 36, the camera module 36 may include a digital camera capable of forming a digital image file from an image captured by camera module 36. As such, the camera module 36 includes all hardware, such as a lens or other optical component(s), and software necessary for creating a digital image file from a captured image. Camera module 36 may also include all hardware, such as a lens or other optical component(s), and software necessary to provide image zooming functionality. Image zooming functionality can include the ability to magnify or de-magnify an image prior to or subsequent to capturing an image. Camera module 36 can operate in conjunction with positioning sensor 37 and orientation module 39 to associate the location and orientation information of mobile terminal 10, at the moment of image capturing, with a digital image file. In some embodiments, a subset of the location and orientation information of mobile terminal 10, at the moment of image capturing, can be associated with a digital image file. Similarly, a zoom level, indicating the degree that camera module 36 was zoomed at the moment of image capturing, can be associated with a digital image file. In embodiments where camera module 36 is used to capture video, a set of location information, orientation information and zoom level can be associated with each frame of the video media, or a set of location information, orientation information and zoom level can be associated with the video media at some regular or irregular interval. Location information, orientation information, and zoom level can be stored as metadata with the associated digital image file. In some embodiments, the zoom level can include information regarding the aspect ratio of a captured image. Alternatively, the camera module 36 may include only the hardware needed to view an image, while a memory device of the mobile terminal 10 stores instructions for execution by the controller 20 in the form of software necessary to create a digital image file from a captured image. In an exemplary embodiment, the camera module 36 may further include a processing element such as a co-processor which assists the controller 20 in processing image data and an encoder and/or decoder for compressing and/or decompressing image data. The encoder and/or decoder may encode and/or decode according to, for example, a joint photographic experts group (JPEG) standard or other format.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an electrically erasable programmable read only memory (EE- PROM), flash memory or the like. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10.

Figure 2:
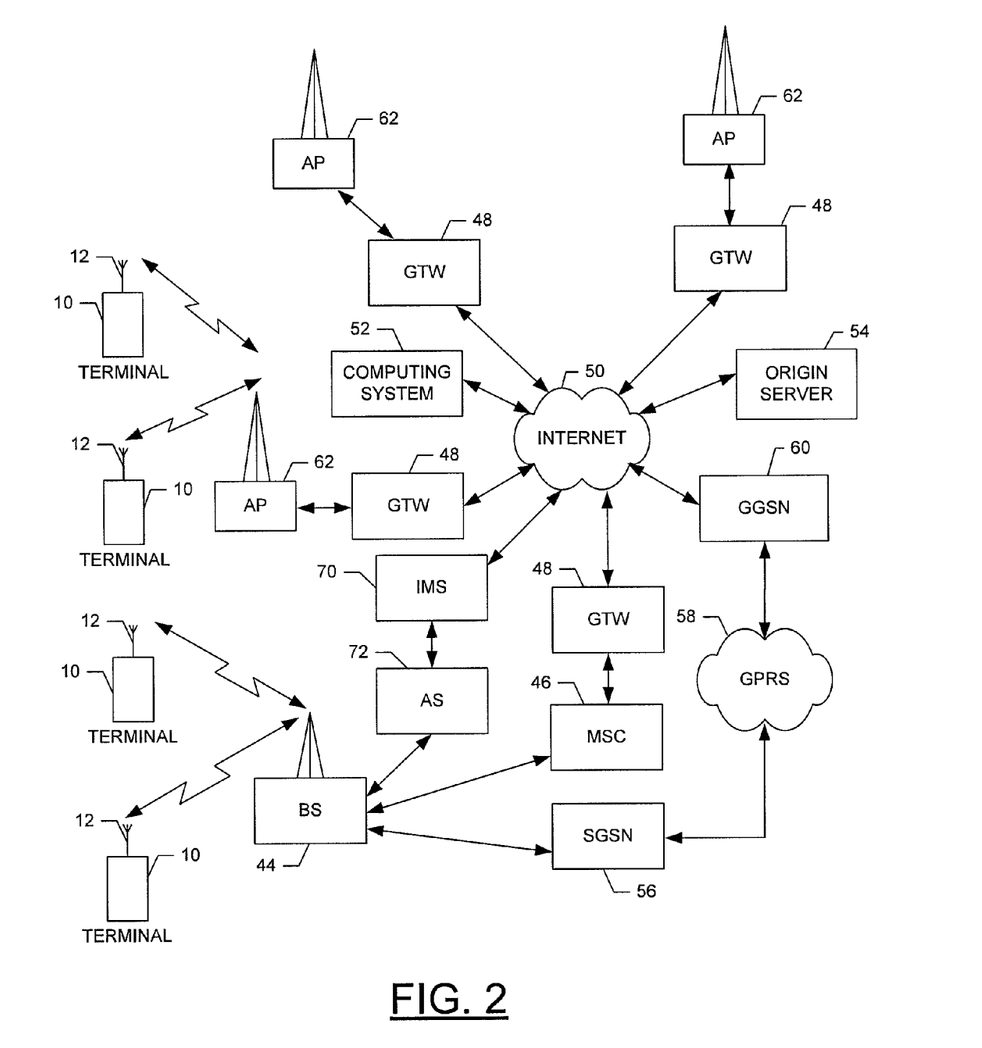
FIG. 2 a schematic block diagram of a wireless communications system according to an exemplary embodiment of the present invention.

FIG. 2 is a schematic block diagram of a wireless communications system according to an exemplary embodiment of the present invention. Referring now to FIG. 2, an illustration of one type of system that may benefit from embodiments of the present invention is provided. The system includes a plurality of network devices. As shown, one or more mobile terminals 10 may each include an antenna 12 for transmitting signals to and for receiving signals from a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 is capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 2, the MSC 46 is merely an exemplary network device and embodiments of the present invention are not limited to use in a network employing an MSC.

The MSC 46 can be coupled to a data network, such as a local area network (LAN), a metropolitan area network (MAN), and/or a wide area network (WAN). The MSC 46 can be directly coupled to the data network. In one typical embodiment, however, the MSC 46 is coupled to a gateway device (GTW) 48, and the GTW 48 is coupled to a WAN, such as the Internet 50. In turn, devices such as processing elements (e.g., personal computers, server computers or the like) can be coupled to the mobile terminal 10 via the Internet 50. For example, as explained below, the processing elements can include one or more processing elements associated with a computing system 52, origin server 54, and/or the like, as described below.

The BS 44 can also be coupled to Internet 50 through an internet protocol multimedia subsystem (IMS) 70 and, in some embodiments, application service (AS) 72. As known to those skilled in the art, IMS can be an internet protocol multimedia subsystem which can provide a framework for delivering internet protocol multimedia to mobile terminals. IMS 70 can provide a link to Internet 50 in a packet switched domain. The link between BS 44 and Internet 50 through IMS 70 can also optionally include AS 72. AS 72 can be an application service that can provide functionality for managing communications sessions.

The BS 44 can also be coupled to a signaling GPRS (General Packet Radio Service) support node (SGSN) 56. As known to those skilled in the art, the SGSN 56 is typically capable of performing functions similar to the MSC 46 for packet switched services. The SGSN 56, like the MSC 46, can be coupled to a data network, such as the Internet 50. The SGSN 56 can be directly coupled to the data network. In a more typical embodiment, however, the SGSN 56 is coupled to a packet-switched core network, such as a GPRS core network 58. The packet-switched core network is then coupled to another GTW 48, such as a GTW GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP) and/or the like, to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) may be capable of supporting communication in accordance with any one or more of a number of first-generation (1G), second-generation (2G), 2.5G, third-generation (3G), 3.9G, fourth-generation (4G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as a UMTS network employing WCDMA radio access technology. Some narrow-band analog mobile phone service (NAMPS), as well as total access communication system (TACS), network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), Bluetooth (BT), infrared (IrDA) or any of a number of different wireless networking techniques, including wireless LAN (WLAN) techniques such as IEEE 802.11 (e.g., 802.11a, 802.11b, 802.11g, 802.11n, etc.), world interoperability for microwave access (WiMAX) techniques such as IEEE 802.16, and/or ultra wideband (UWB) techniques such as IEEE 802.15 and/or the like. The APs 62 may be coupled to the Internet 50. Like with the MSC 46, the APs 62 can be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

As will be appreciated, by directly or indirectly connecting the mobile terminals 10 and the computing system 52, the origin server 54, and/or any of a number of other devices, to the Internet 50, the mobile terminals 10 can communicate with one another, the computing system, 52, the origin server 54, etc., to thereby carry out various functions of the mobile terminals 10, such as to transmit data, content or the like to, and/or receive content, data or the like from, the computing system 52, and/or the origin server 54, etc.

Although not shown in FIG. 2, in addition to or in lieu of coupling the mobile terminal 10 to computing systems 52 across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX, UWB techniques and/or the like. Computing system 52 can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals). Like with the computing system 52, the mobile terminal 10 may be configured to communicate with the portable electronic devices in accordance with techniques such as, for example, RF, BT, IrDA or any of a number of different wireline or wireless communication techniques, including universal serial bus (USB), LAN, WLAN, WiMAX, UWB techniques and/or the like.

Figure 3:
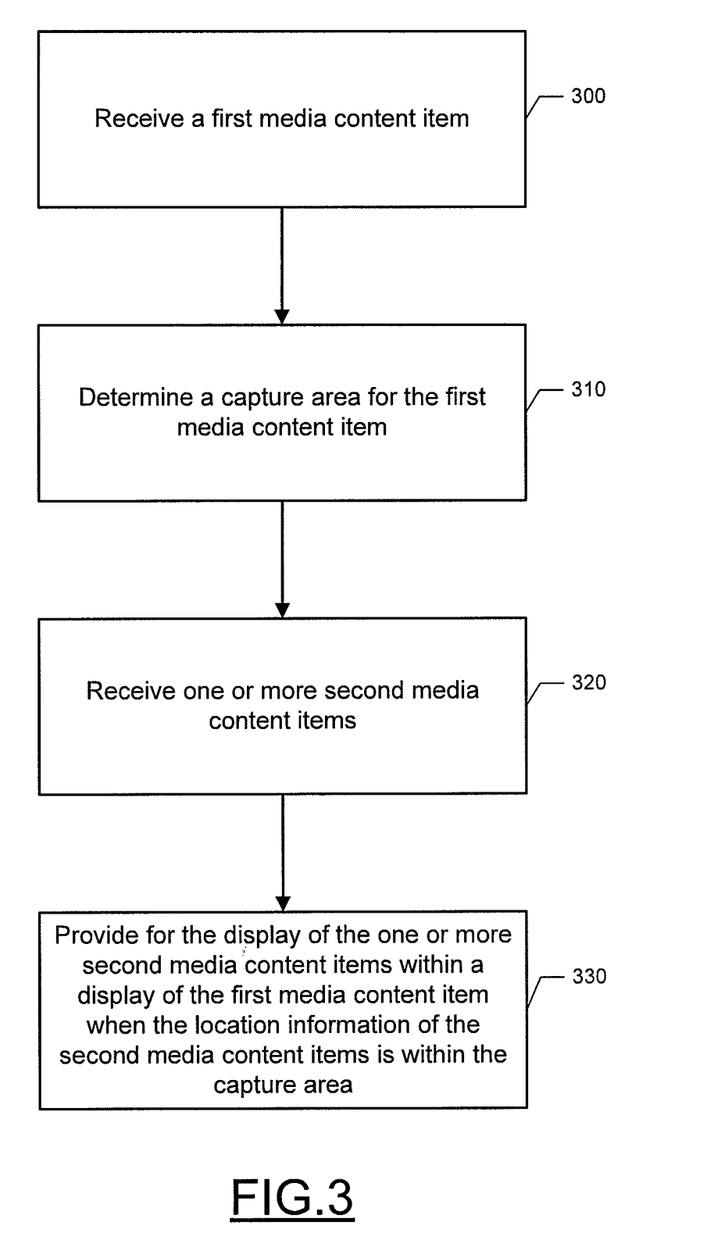
FIG. 3 is a flow chart of a method of displaying media content items according to an exemplary embodiment of the present invention.

FIG. 3 depicts a flow chart of a method of displaying media content items according to an exemplary embodiment of the present invention. The method of FIG. 3 can include the operations of receiving a first media content item at 300, determining a capture zone for the first media content item at 310, receiving one or more second media content items at 320, and displaying second media content items within the first media content item when the location information of the second media content items is within the capture zone at 330.

At 300, a first media content item can be received. A first media content item can be any type of media content, including but not limited to a photograph, video, or any other visual content. In some embodiments, the first media content item can be an image or video captured by camera module 36 of mobile terminal 10. The first media content item can include associated location information, orientation information, and a zoom level or some subset thereof. In some embodiments, the location information, orientation information, and zoom level associated with the first media content item can be generated by positioning sensor 37, orientation module 39, and camera module 36, respectively.

In some embodiments the first media content item can be received on any computing device including, but not limited to mobile terminal 10 or other means. The first media content item can be received via any type of communications system, such as the communications system of FIG. 2. In some embodiments, the first media content item can be received on a wired device, such a personal computer connected to the Internet.

In some embodiments, the process of receiving a first media content item at 310 can include uploading the first media content item to an online service, such a social networking website or photo sharing website, or to a server, such as the computing system 52 of FIG. 2. In some embodiments, the process of receiving the first media content item at 300 can further include capturing the first media content item with an appropriate device, such as the camera module 36 of mobile terminal 10, a camera, a video camera, a digital camera or a digital video camera. In some embodiments, the process of receiving the first media content item at 300 can occur, for example, when the first media content item is displayed or after the first media content item is selected. The first media content item can be received as a digital media file, such as a digital image file or a digital video file. In some embodiments, the first media content item may be converted into a digital media file from an analog format prior to being received at 300.

At 310, a capture zone for the first media content item can be determined. A capture zone can be the real-world area or volume depicted in a media content item. The capture zone can be determined by any means including, but not limited to, a processor such as the controller 20 of mobile terminal 10. The capture zone and can be described by a set of location coordinates, such as, for example, geographical coordinates. In some embodiments, the capture zone can be a volume which describes the three-dimensional volume depicted in the first media content item. As such, in some embodiments, a capture zone can be described by a set of location coordinates that may include, for example, geographical coordinates and altitude coordinates. In some embodiments, location information, orientation information, and a zoom level, or some subset thereof, can be used to determine the set of location coordinates of the first media content item that described the capture zone. In some embodiments, a user may provide the information necessary to determine the set of location coordinates and the associated capture zone. For example, a user may define the capture zone by marking an area on a map within a mapping application. In embodiments where the first media content item is a video, a series of sets of location coordinates for each frame of media content can be determined, or a series of location coordinates at some regular or irregular interval can be determined. In some embodiments, the content of the image can also be used to determine the capture zone of the first media content item.

In some embodiments, determining the capture zone for the first media content item at 310 can occur, for instance, when the first media content item is first uploaded. In this regard, the set of coordinates for the capture zone can be stored for later use. The set of coordinates can be stored separately from the first media content item with a link to the first media content item, or the set of coordinates can be stored with the same media content file as, for example, metadata. In other embodiments, determining the capture zone for the first media content item at 310 can occur, for instance, when the first media content item is displayed or after the first media content item is selected.

At 320, one or more second media content items can be received. The one or more second media content items can be received by any means including, but not limited to, a processor such as the controller 20 of mobile terminal 10. A second media content item can be any type of media content, including but not limited to a photograph, video, icon, avatar, model, bitmap, other digital visual object, other visual content, other objects that can be represented in graphical form, text, other non-graphical objects, etc. Further, the second media content item can be two dimensional or three dimensional. Further, the second media content item can have associated location and orientation information, or some subset thereof. In some embodiments, the location information and orientation information, or some subset thereof, of the second media item can be provided by the position sensor 37 and the orientation module 39 of mobile terminal 10. Further, mobile terminal 10 may transmit location and orientation information, or some subset thereof, to a server or various other devices via the communication system of FIG. 2. In some embodiments, the second media content item can have a size with respect to the real world.

In some embodiments, a second media content item can be a visual depiction of a virtual object, that is, an object that does not exist in the real world. The virtual object can be located a particular real world location, and, in some instances at a particular real world orientation. In other embodiments, a second media content item can be a visual representation of a real world object, that is, an object that exists in the real world, such as a person. The real world object can be located a particular real world location, and, in some instances at a particular real world orientation. Where the real world object is mobile, such as a person, the location information and the orientation information can change as the real world object moves within the real world. As such, since second media content items can be associated with various virtual and real world objects, in some embodiments, multiple second media content items can be received at 320. In this regard, groupings of second media content items can be defined based on predefined preferences, and can describe, for example, peer groups, or security groups. In some embodiments when groups are utilized, only the second media content items associated with objects in a particular group are received at 320.

In some embodiments, second media content items may be locational media. In other words, second media content item may be media content that is not associated with a virtual or real world object, but may merely be associated with a location. For example, consider a second media content item that is a photograph that is not associated with a virtual or real world object, but has location information and orientation information, or some subset thereof, associated with it. According to embodiments of the invention, when a first media content item is displayed as described herein, one or more second media content items, for example, locational media such as, the photograph with location information and orientation information, or some subset thereof, that is not associated with a virtual or real world object, can be displayed within the first media content item in accordance with various embodiments. In this regard, in some embodiments, small versions, i.e. thumbnail versions, of the second media content items can be displayed within the first media content item according to various embodiments.

In some embodiments, the second media content device can be associated with additional information. For example, if the second media content item is a real world object, such as a person, the additional information can include, a person's profile, a status of a person, e.g. busy, sleeping, or watching a movie, links to related Internet sites, the music that is currently being played by the person's mobile device, historical location information and orientation information, or some subset thereof, any information shared by the person on a related website, or information about other nearby devices, people or objects. Further, the additional information associated with a second media content device can include contextual information that a user wishes to share.

Further, a link can be included that can enable a user to follow a selected second media content item. In this regard, when the location or orientation information indicates that the second media content item has moved into a new capture zone, the first media content item associated with the capture zone can be displayed with a display of the second media content item as described herein.

In some embodiments, a second media content item can be animated, and the animation can be location or time dependant. For example, a second media content item can be a three dimensional image of a person. In this regard, if the three dimensional image of the person is animated with regard to location, the three dimensional image of a person can appear as if it is walking when the associated location information changes. In some embodiments, the animation of a second media content item can be controlled by a user or a program. For example, a program may use logic that causes a second media content to move from one location to another at particular times. Further, for example, a program may be used that causes a virtual object that is a tree to grow in size over time. In this regard, in some embodiments, as a second media content item moves, it may enter the capture zone of a new first media content item. In some embodiments, when a second media content item moves into the capture zone of a first media content item, the first media content item can be displayed with a display of the second media content item as described herein.

In some embodiments, a second media content item can be non-graphical, such as text. The text can take the form of a tag, where the tag, for example, describes the location where the tag is placed. In some embodiments, users may confirm the accuracy of the tag or remove the tag.

In some embodiments, the location information and the orientation information, or some subset thereof, for a second media content item can be provided by a service interface. For example, a web interface, computer application, or mobile application can be used to provide location, and in some instances, orientation information. In some embodiments, a user can to select a second media content item and place the second media content item at a particular location. In some embodiments, a service interface can be built on top of a map-based interface, such that a user can select a location on a map, and place a second media content item at the selected location. In some embodiments, a user can additionally select an orientation for a second media content item. When placing an second media content item, a user may also select a size for the second media content item.

In some embodiments a second media content item can be received on any computing device including, but not limited to mobile terminal 10 or other means. A second media content item can be received via any type of communications system, such as the communications system of FIG. 2. In some embodiments, a second media content item can be received on a wired device, such a personal computer connected to the Internet.

The process of receiving a second media content item at 320 can include uploading a second media content item to an online service, such a social networking website or photo sharing website, or to a server, such as the computing system 52 of FIG. 2. In some embodiments, the process of receiving a second media content item at 330 can occur, for example, when a request is sent to display the first media content item. The second media content item can be received as a digital media file, such as a digital image file or a digital video file. In some embodiments, the second media content item may be converted into a digital media file from an analog format prior to being received at 320.

At 330, second media content item can be displayed within the first media content item when the location information of the second media content item is within the capture zone. Providing for the display of the second media content item within a display of the first media content item can be by any means including, but not limited to, a processor such as the controller 20 of mobile terminal 10. In some embodiments a second media content item can be displayed within the first media content item on any computing device including, but not limited to mobile terminal 10 or other means. At 330, an analysis of the capture zone and the location information of a second media content item can occur. If the analysis indicates that the location information of the second media content item is within the capture zone, then when the first media content item is displayed, the second media content item with appear within the first media content item. In some embodiments, the orientation information of the first and second media content items can be analyzed to determine the respective orientations when displayed. In this regard, the second media content item can be displayed within the first media content item at a determined orientation. In some embodiments, a listing of the second media content items that have location information within the capture zone of the first media content item can be generated and displayed. In this regard, the list can be a textual listing or second media content items can be displayed in a list fashion, such as, for example, in a row or column.

In some embodiments, operation 330 can occur when the first media content item is displayed. In some embodiments operation 330 can be repeated at regular or irregular intervals, such as when the location or orientation information of a second media content changes, in order to display the movements of a second media content item within the capture zone of the first media content item. In some embodiments, the second media content item can overlay the first media content item. In this regard, the second media content item can be embedded into the digital media file of the first media content item. In some embodiments, the second media content item can use flash animation to overlay the first media content item or other means that does not affect the digital media file of the first media content item. In embodiments where one or more second media content items are embedded in a first media content item's digital media file, a backup of the original digital media file can be generated. Further, in some embodiments, a response to a query of a user may determine whether second media content items are embedded.

In some embodiments, the manner in which the second media content item is displayed within the first media content item can change with respect to the location and orientation of the second media contact item within the capture zone of the first media content item. For example, a second media content item may appear larger when the location of the second media content item is close in proximity to the location where the first media content item was captured. In some embodiments, the zoom level of the first media content item can be considered when resizing the second media content item. Further in some embodiments, an analysis of a predefined group of second media content items can occur, and as a result various second media content items may be displayed within the first media content item at 330.

In various embodiments, additional information associated with a second media content item can be displayed when a user selects the second media content item. In some embodiments, the general public may be able to access some or all additional information, or a selected group of users may be able to access some or all additional information. Additionally, upon selection of a second media content item, a message, such as a short message service (SMS) message, may be sent to a person associated with the second media content item, for example, on the person's mobile terminal 10. Additionally, after selection of a second media content item, historical location, and in some instances, orientation information can be retrieved. In this regard, the second media content item can be displayed within the first media content item at some time in the past. In some embodiments, the time in the past can be selected by a user. For example, there could be a movable timeline displayed with the first media content item that can enable a user to browse what has happened inside the capture zone of the first media content item in the past. For example, consider a first media content item that is a photograph and displays a statue in Helsinki centrum. The movable timeline can be moved to, for example, to Jan. 12, 2006 at 12:43 pm. As a result, all the second media content items that were located inside the capture zone of first media content item at that specific time can be displayed with the first media content item as described herein. In this regard, rewinding, playing, and fast forwarding functionality can be used to display the movements associated with one or more second media content items within the first media content items in the past. Additionally, in some embodiments, for instance when a second media content item is a locational media, selecting the second media content item can open a display of the second media content item where the second media content item is treated as first media content item.

Additionally, rules can be implemented for displaying second media content items. In some embodiments, only the second media content items that satisfy the rules will be displayed. For example, a rule may be implemented that only allows particular second media content items to be displayed at night or on a particular day of the year. In some embodiments, an indication of a second media content item can be displayed within the first media content item when the location information defines a point within a predefined range of the capture zone of the first media content item. In this regard, in some embodiments, the indication of the second media content item can be displayed within the first media content item at the point within the capture zone that is closest to the location of the second media content item. In this regard, in some embodiments the indications of the second media content items can be a listing of second media content items that fall within the predefined range. The indication of the second media content item can be selectable in the same manner as the second media content item. In various embodiments, a listing of the second media content items that have location information within the capture zone of the first media content item can be generated and displayed, when, for example, a threshold number of second media content items are located within a capture zone.

Figure 4A:
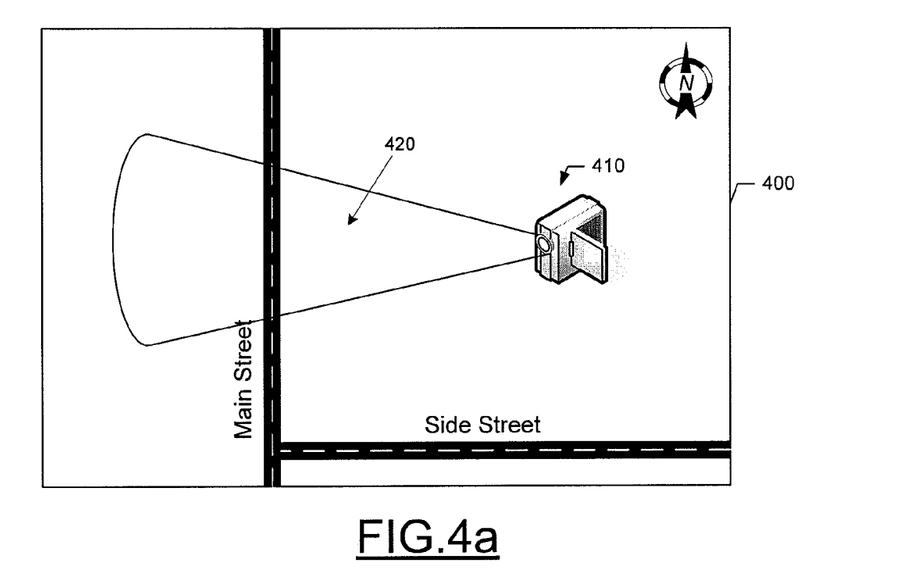
FIG. 4a is a map diagram indicating a capture zone according to an exemplary embodiment of the present invention.

FIGS. 4a through 4f depict various example embodiments and implementations of the invention and are used for illustration purposes. FIG. 4a is a map diagram according to an exemplary embodiment of the present invention. FIG. 4a includes a map 400, a media capturing device 410, and a capture zone 420. The map 400 can be any type of geographical map, such as, for example, a road map. The media capturing device 410 can be any type of media capturing device having media capturing capabilities similar to the camera module 36 of mobile terminal 10. In some embodiments, media capturing device 410 can also include location capturing capabilities, and in some instances orientation capturing capabilities, similar to the positioning sensor 37 and the orientation module 39, respectively, of mobile terminal 10. Capture zone 420 depicts the area on the map 400 that is depicted in, for example, a photograph taken at the location of the media capturing device 410 in the illustrated direction. It should be noted that the capture zone 420 of FIG. 4a is a two dimensional representation of a capture zone. As described above, in some embodiments of the invention a capture zone can be a three dimensional volume.

Figure 4B:
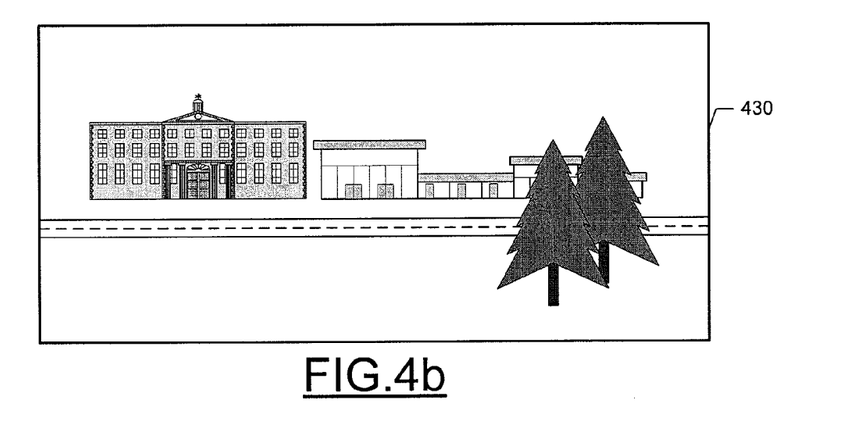
FIG. 4b is an illustration of a first media content item according to an exemplary embodiment of the present invention.

FIG. 4b is an illustration of a first media content item according to an exemplary embodiment of the present invention. Photograph 430 in FIG. 4b is depicted as an example of a first media content item which could have been captured by media capturing device 410. According to embodiments of the invention, the capture zone 420 should describe the area displayed within the image of photograph 430.

Figure 4C:
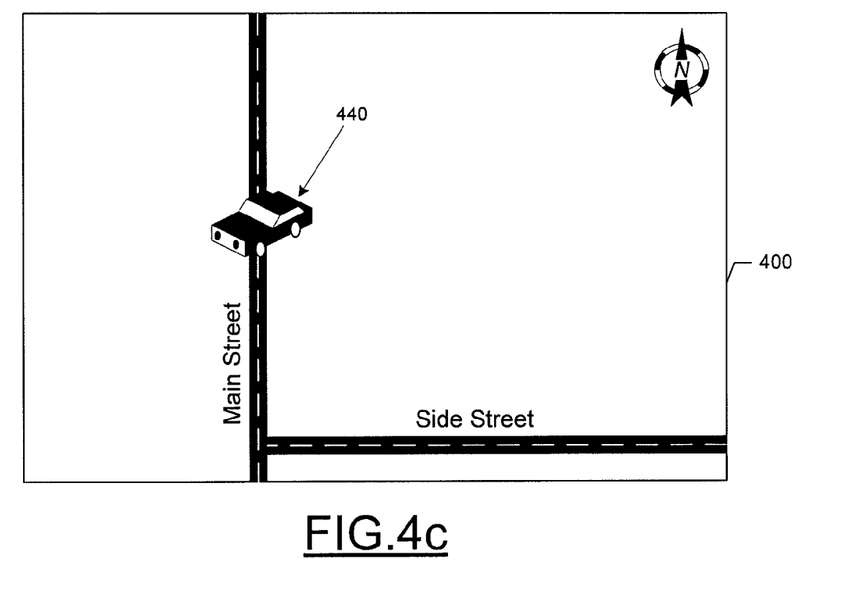
FIG. 4c is a map diagram including a second media content item according to an exemplary embodiment of the present invention.
Figure 4D:
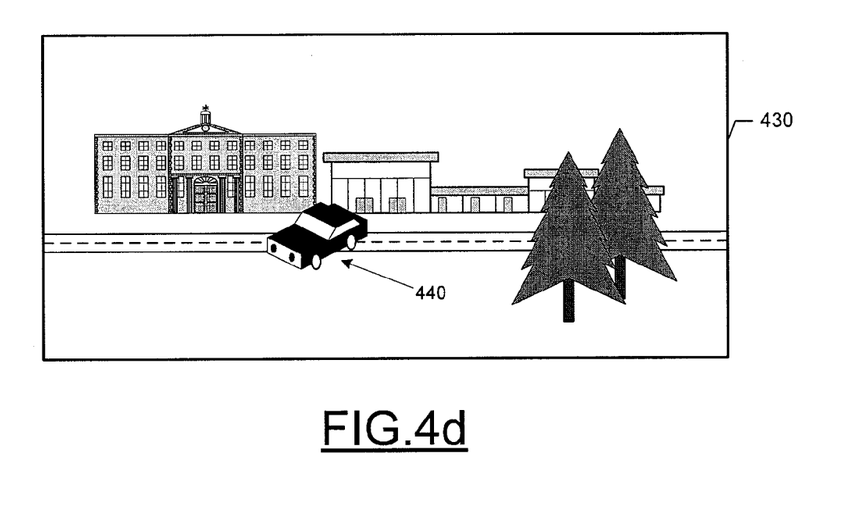
FIG. 4d is an illustration of a first media content item including a second media content item where the second media content item is a virtual object according to an exemplary embodiment of the present invention.

FIG. 4c is a map diagram including a second media content item according to an exemplary embodiment of the present invention. Car object 440 is depicted as an example of a second media content item. In this example, assume the car object 440 can be a virtual object, that is, assume that car object 440 is not associated with a real world object. Car object 440, as a virtual object has been located a particular real world location as depicted in FIG. 4c. By referring back to FIG. 4a it can be determined that car object 440 has been located within the capture zone of photograph 430. As such, according to various embodiments of the invention, when photograph 430 is displayed, car object 440 can be included in photograph 430 as depicted in FIG. 4d.

Figure 4E:
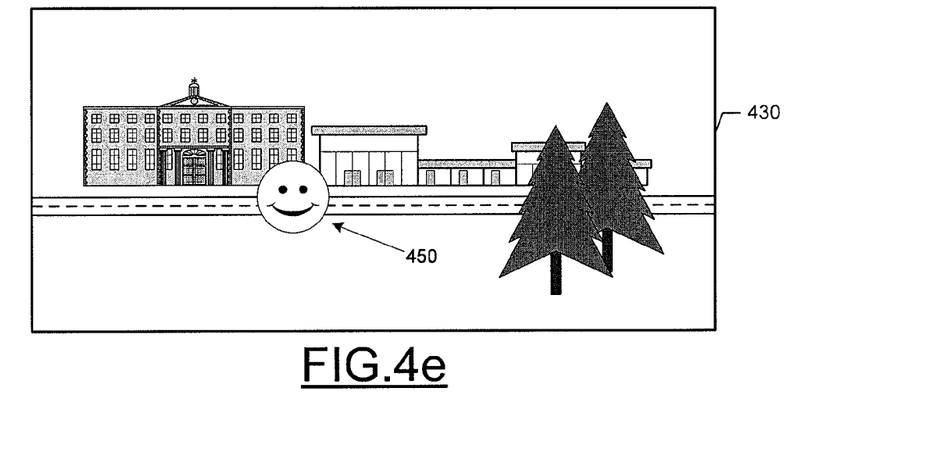
FIG. 4e is an illustration of a first media content item including a second media content item where the second media content item is a real world object according to an exemplary embodiment of the present invention.

FIG. 4e is an additional illustration of a second media content according to an exemplary embodiment of the present invention. Avatar object 450 is depicted as an example of a second media content item. In this example, assume the avatar object 450 can be a real world object, namely a person with a mobile device such as mobile terminal 10. The mobile device can include location capturing capabilities, and in some instances orientation capturing capabilities, similar to the positioning sensor 37 and the orientation module 39, respectively, of mobile terminal 10. Assume that the person and the mobile device are currently located with in the capture zone 420 of the photograph 430. As such, when photograph 430 is displayed, avatar object 450 can be displayed within photograph 430 at a location associated with the location where the mobile device is located within the capture zone 420. In some embodiments, as the person and accordingly the mobile device move the display of photograph 430 can change as appropriate to indicate the movement. In some embodiments the size of the avatar object can change depending on the proximity of the location information associated with avatar object 440 to the location where which photograph 430 was taken.

Figure 4F:
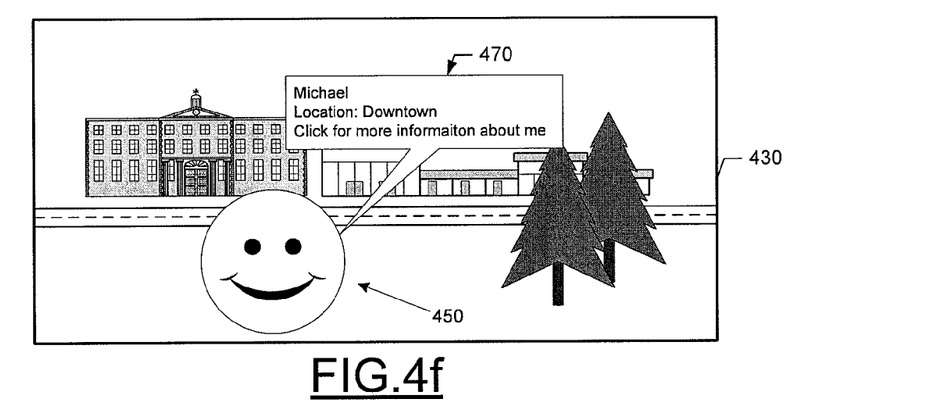
FIG. 4f is an illustration of a first media content item including a second media content item where the second media content item is a real world object according to an exemplary embodiment of the present invention.

FIG. 4f depicts photograph 430 with a larger version of avatar object 430. Assume that the person and accordingly the mobile device associated with the person moved towards the location where the photograph 430 was taken. As a result of this movement, according to various embodiments of the invention, the avatar object 450 can change in size to indicate the proximity between the mobile device and the location where photograph 430 was taken, and in this case avatar object 450 can be larger due to movement towards the location where photograph 430 was taken. Additionally, in some embodiments, if the person and the associated mobile device were to turn around and walk away from the location where photograph 430 was taken, then avatar object 450 can reduce in size, and, in some embodiments, due to the change in orientation, a back view of avatar object 450 can be displayed. FIG. 4d also includes example additional information 470 that can describe the avatar object 450 and the underlying person. In some embodiments, additional information 470 can be displayed when avatar object 450 is displayed with in photograph 430 or when avatar object 450 is selected.

According to one aspect of the present invention, the electronic device, such as mobile terminal 10, which implements embodiments of the present invention generally operates under control of a computer program product. The computer program product for performing the methods of embodiments of the present invention includes a computer-readable storage medium and computer-readable program code portions, such as a series of computer instructions, embodied in the computer-readable storage medium.

In this regard, FIG. 3 is a flowchart of method, apparatus and program products according to exemplary embodiments of the present invention. It will be understood that each block or step of the flowchart, and combinations of blocks in the flowchart, can be implemented by computer program instructions. These computer program instructions may be loaded onto a computer or other programmable apparatus, such as controller 20, to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block (s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems which perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
  receiving a first media content item that includes location information;
  determining a capture zone for the first media content item based upon the location information;
  receiving a second media content item that includes location information; and determining to render at a user interface a presentation of the second media content item within a presentation of the first media content item when the location information of the second media content item indicates that the second media content item is or was located within the capture zone.

2. The method of claim 1, wherein the presentation of the second media content item is rendered at a location within the presentation of the first media content item that is associated with the location where the second media content item is found within the capture zone.

3. The method of claim 2, further comprising:
updating the presentation of the second media content item when the location information of the first media content item changes, when the location information of the second media content item changes, or a combination thereof.

4. The method of claim 2, further comprising:
varying a size of the presentation of the second media content item depending on the distance between where the first media content item was captured and where the second media content item was located.

5. The method of claim 1, wherein the second media content item further includes orientation information, zoom information, or a combination thereof, and the presentation of the second media content item is rendered according to the orientation information, zoom information, or a combination thereof, with respect to the location information, orientation information, zoom information, or a combination thereof, of the first media content item.

6. The method of claim 1, further comprising
determining to render an indication of the second media content item within the presentation of the first media content item when the location information of the second media content item indicates that the second media content item is located outside the capture zone but within a predetermined range of the capture zone.

7. The method of claim 6, wherein when location information of a plurality of second media content items indicate that the second media content items are or were located within the capture zone, the indication includes one or more real world objects, one or more virtual objects, a list of real world objects, a list of virtual objects, a list of real world and virtual objects, a link to real world objects or to a list of the real world objects, a link to virtual objects or to a list of the virtual objects, a link to real world and virtual objects or to a list of the real world and virtual objects, or a combination thereof.

8. The method of claim 1, further comprising:
determining to render the presentation of the second media content item to be activated either to trigger presentation of additional information associated with the second media content item, or to transmit a message to an entity associated with the second media content item, or a combination thereof.

9. The method of claim 8, wherein the additional information associated with the second media content item includes a person profile, an activity status of the person, music currently being played by a device of the person, historical location information, information of a nearby device, person or object, or a combination thereof.

10. The method of claim 1, further comprising:
determining to render a timeline of the first media content item associated with one time point or period, wherein the timeline is to be activated either to trigger presentation of a scene of the first media content item associated with another time point or period, or to update the presentation of the second media content item associated with the different time point or period, or a combination thereof.

11. The method of claim 1, wherein the first and second media content media content items include a photograph, thumbnail, video, icon, avatar, animation, model, bitmap, digital visual object, object represented in text, 2D, or 3D, or a combination thereof.

12. The method of claim 1, further comprising:
determining to render at the user interface a map presentation;
receiving user selection of a location on the map presentation; and
moving the presentation of the second media content item to the selected location.

13. An apparatus comprising:
at least one processor; and
at least one memory including computer program code for one or more programs,
the at least one memory and the computer program code configured to, with the at least one processor, cause the apparatus to perform at least the following,
receive a first media content item that includes location information;
determine a capture zone for the first media content item based upon the location information;
receive a second media content item that includes location information; and
determine to render at a user interface a presentation of the second media content item within a presentation of the first media content item when the location information of the second media content item indicates that the second media content item is or was located within the capture zone.

14. The apparatus of claim 13, wherein the presentation of the second media content item is rendered at a location within the presentation of the first media content item that is associated with the location where the second media content item is found within the capture zone.

15. The apparatus of claim 14, wherein the apparatus is further caused to:
update the presentation of the second media content item when the location information of the first media content item changes, when the location information of the second media content item changes, or a combination thereof.

16. The apparatus of claim 14, wherein the apparatus is further caused to:
vary a size of the presentation of the second media content item depending on the distance between where the first media content item was captured and where the second media content item was located.

17. The apparatus of claim 13, wherein the apparatus is further caused to:
receive orientation information, zoom information, or a combination thereof, with respect to the second media content item, and to render the presentation of the second media content item according to the orientation information, zoom information, or a combination thereof, with respect to the location information, orientation information, zoom information, or a combination thereof, of the first media content item.

18. The apparatus of claim 13, wherein the apparatus is further caused to:
determine the capture zone by using the location information of the first media content item and orientation information of the first media content item.

19. The apparatus of claim 13, wherein the apparatus is further caused to:
  determine to render an indication of the second media content item within the presentation of the first media content item when the location information of the second media content item indicates that the second media content item is located outside the capture zone but within a predetermine range of the capture zone.

20. The apparatus of claim 13, wherein the apparatus is further caused to:
  determine whether the location information of the second media content item describes a location within the capture zone.

21. The apparatus of claim 13, wherein the location information of the second media content item is associated with a location of a mobile device.

22. The apparatus of claim 13, wherein the apparatus is further caused to:
  receive orientation information of the second media content item, where the location information and the orientation information of the second media content item are associated with a location and orientation of a mobile device.

23. A computer-readable storage medium carrying one or more sequences of one or more instructions which, when executed by one or more processors, cause an apparatus to perform at least the following steps:
  receiving a first media content item wherein the first media content item includes location information;
  determining a capture zone for the first media content item based on the location information;
  receiving a second media content item wherein the second media content item includes location information; and
  determining to render at a user interface a presentation of the second media content item within a presentation of the first media content item when the location information of the second media content item indicates that the second media content item is or was located within the capture zone.

24. The computer-readable storage medium of claim 23, wherein the apparatus is caused to further perform:
  receiving the location information of the second media content item that is associated with the location of a mobile device.

25. A system comprising:
  a transmitter module configured to transmit location information associated with the location of the transmitter module; and
  a receiver module configured to:
    receive a first media content item and a second media content, wherein the first media content item includes location information;
    determine a capture zone for the first media content item based on the location information of the first media content item;
    associate the location information of the transmitter module with the second media content item; and
    determine to render at a user interface a presentation of the second media content item within a presentation of the first media content item when the location information associated with the second media content item indicates that the second media content item is or was located within the capture zone.

* * * * *